United States Patent
Lauria

(10) Patent No.: US 9,689,287 B2
(45) Date of Patent: Jun. 27, 2017

(54) BYPASS VALVE FOR A LUBRICATING CIRCUIT OF AN INTERNAL COMBUSTION ENGINE EQUIPPED WITH A COOLER OF A RESPECTIVE LUBRICATING FLUID

(71) Applicant: FPT Industrial S.p.A., Turin (IT)

(72) Inventor: Dario Lauria, Turin (IT)

(73) Assignee: FPT INDUSTRIAL S.P.A., Turin (IT)

( * ) Notice: Subject to any disclaimer, the term of this patent is extended or adjusted under 35 U.S.C. 154(b) by 198 days.

(21) Appl. No.: 14/668,758

(22) Filed: Mar. 25, 2015

(65) Prior Publication Data
US 2015/0275714 A1 Oct. 1, 2015

(30) Foreign Application Priority Data
Mar. 27, 2014 (IT) .............................. MI2014A0527

(51) Int. Cl.
| | |
|---|---|
| *F01M 5/00* | (2006.01) |
| *F16K 3/24* | (2006.01) |
| *F16K 27/04* | (2006.01) |
| *F16K 31/00* | (2006.01) |
| *F01P 7/02* | (2006.01) |
| *F01M 11/03* | (2006.01) |
| *F01P 11/08* | (2006.01) |

(52) U.S. Cl.
CPC ............ *F01M 5/005* (2013.01); *F01M 5/002* (2013.01); *F01M 5/007* (2013.01); *F16K 3/24* (2013.01); *F16K 27/041* (2013.01); *F16K 31/002* (2013.01); *F01M 5/001* (2013.01); *F01M 11/03* (2013.01); *F01P 7/026* (2013.01); *F01P 11/08* (2013.01)

(58) Field of Classification Search
CPC ........ F01M 5/002; F01M 5/007; F01M 11/03; F01M 5/001; F01P 11/08; F01P 7/026
USPC ...................................................... 123/196 AB
See application file for complete search history.

(56) References Cited

U.S. PATENT DOCUMENTS

| | | | |
|---|---|---|---|
| 4,027,643 A | 6/1977 | Feenan et al. | |
| 2012/0247582 A1* | 10/2012 | Lamb .................... | F16K 11/044 137/468 |

FOREIGN PATENT DOCUMENTS

| | | | | |
|---|---|---|---|---|
| DE | 10346195 A1 * | 4/2005 | ............ | F01M 5/007 |
| EP | 0969185 A1 | 1/2000 | | |
| GB | 1595051 | 8/1981 | | |
| JP | S57142109 | 9/1982 | | |
| JP | S5996314 | 6/1984 | | |
| JP | H03172522 | 7/1991 | | |

* cited by examiner

*Primary Examiner* — Jacob Amick
*Assistant Examiner* — Charles Brauch
(74) *Attorney, Agent, or Firm* — Stetina Brunda Garred and Brucker

(57) ABSTRACT

Bypass valve for a lubrication circuit of an internal combustion engine equipped with a cooler of a respective lubricating fluid, the valve comprising a tubular body, a first outlet opening, a second outlet opening and a movable shutter slidingly associated to the tubular body so as to define a slide valve, wherein the valve comprises a bypass duct having development parallel to said development axis and partially penetrating in the tubular body to bypass said shutter.

9 Claims, 3 Drawing Sheets

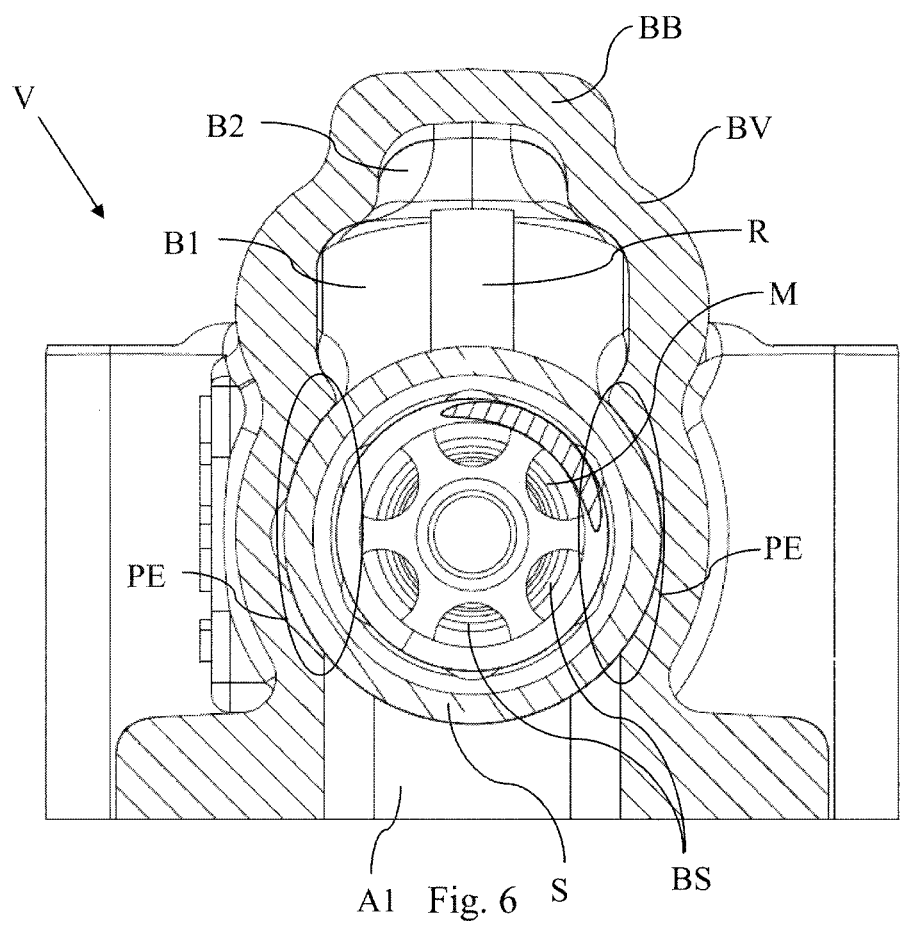

BYPASS VALVE FOR A LUBRICATING CIRCUIT OF AN INTERNAL COMBUSTION ENGINE EQUIPPED WITH A COOLER OF A RESPECTIVE LUBRICATING FLUID

CROSS REFERENCE TO RELATED APPLICATIONS

The present application claims priority to Italian Patent Application No. MI2014A000527 filed Mar. 27, 2014, the entirety of the disclosures of which are expressly incorporated herein by reference.

STATEMENT RE: FEDERALLY SPONSORED RESEARCH/DEVELOPMENT

Not Applicable.

FIELD OF APPLICATION OF THE INVENTION

The present invention refers to the field of lubrication circuits of internal combustion engines equipped with a cooler of a respective lubricating fluid and in particular a bypass valve to bypass said cooler in at least one operating condition of the lubricating circuit.

STATE OF THE ART

The lubricating circuit of an internal combustion engine plays an important role in the overall efficiency of the engine.

It is desirable for the oil to reach a correct operating temperature as soon as possible in order to optimise operation of the engine by reducing the friction, with consequent increase in mechanical efficiency. However, once the oil has reached said correct operating temperature, it must be maintained to prevent alteration of the characteristics of the lubricant, consequently affecting the reliability of the internal combustion engine.

The lubrication circuits are therefore equipped with a cooler, also called "exchanger", which guarantees maintenance of the temperature of the lubricating oil at a predefined threshold.

Ideally in the initial engine heating stages, the lubricating oil should not pass through the exchanger, at least for the first few minutes of operation of the internal combustion engine.

It is therefore expedient to install a bypass valve which excludes/includes said exchanger from/in the lubrication circuit in relation to the operating conditions of the lubricating circuit.

An electric valve, for example a solenoid valve, is an optimal solution in terms of reactivity, but it is not optimal in terms of complication/robustness of the system. In fact, an electric valve has a very limited resistance to wear and at least one pair of electric conductors has to be provided for its control.

Thermostatic valves are also known, widely used in cooling circuits.

These are valves which operate a shutter that moves between two extreme conditions, due to the expansion of a thermal material, sensitive to temperature, for example expansion wax.

Slide type thermostatic valves exist, as shown in FIGS. 1-3 of the known art.

An example of such a device is given in JPS57142109, whose reference numbers are recalled in parenthesis.

The mobile shutter S (74) has an axial symmetry with respect to the development axis X of the valve and slides axially in a tubular body BV blocking a first opening A1 (76) and leaving open a second opening A2 (75) and vice versa.

The sensor T (72) containing thermal material is also arranged inside the tubular body BV to be constantly lapped by the flow F of lubricating fluid to detect the temperature thereof and therefore operate the mobile shutter S (74).

The mobile shutter S (74) comprises a plurality of openings BS (74a, 74b) parallel to the development axis X to allow the lubricating oil to reach the second opening A2 (75), as long as the first opening A1 (76) is blocked by the mobile shutter S, see FIG. 1.

When the flow of lubricating oil reaches the correct operating temperature, the sensor T (72) expands, bringing the mobile shutter S (74) to the closing position of the second opening A2 (75), leaving the opening A1 (76) open.

While the opening A2 (75) is directly connected to the internal combustion engine E for lubrication of its components, the opening A1 (76) is connected to the internal combustion engine E via the cooler C.

The problem with this technology is that when the cooler is bypassed, the pressure losses introduced by the slide valve are not negligible, resulting in a pumping loss of the lubricating oil which must be compensated for by a higher fuel consumption.

For these reasons, in the past the use of solenoid valves was preferred, or circuits for bypass of the cooler were preferably not introduced.

SUMMARY OF THE INVENTION

The object of the present invention is therefore to overcome all the above-mentioned drawbacks and to indicate a bypass valve for a lubrication circuit of an internal combustion engine equipped with cooler of a respective lubricating fluid.

The basic idea of the present invention is to provide a bypass of the mobile shutter of a thermostatic slide valve, so as to minimise the pressure losses introduced by the valve.

According to the invention, said bypass is provided by modifying the tubular body of the valve, introducing a parallel duct which allows the mobile shutter to be bypassed, at least as long as it is in the retracted position.

The claims describe preferred embodiments of the present invention, forming an integral part of the present description.

BRIEF DESCRIPTION OF THE FIGURES

Further objects and advantages of the present invention will become clear from the following detailed description of an embodiment example of the same (and of its variations) and from the accompanying drawings provided purely by way of non-limiting example, wherein:

FIG. 6 shows a cross section of any of the views of FIGS. 4 and 5.

The same reference numbers and letters in the figures identify the same elements or components.

In the ambit of the present description, the term "second" component does not imply the presence of a "first" component. Said terms are in fact used for clarity purposes only and should not be interpreted in a limiting sense.

DISCLOSURE OF EMBODIMENT EXAMPLES

Figure 4:
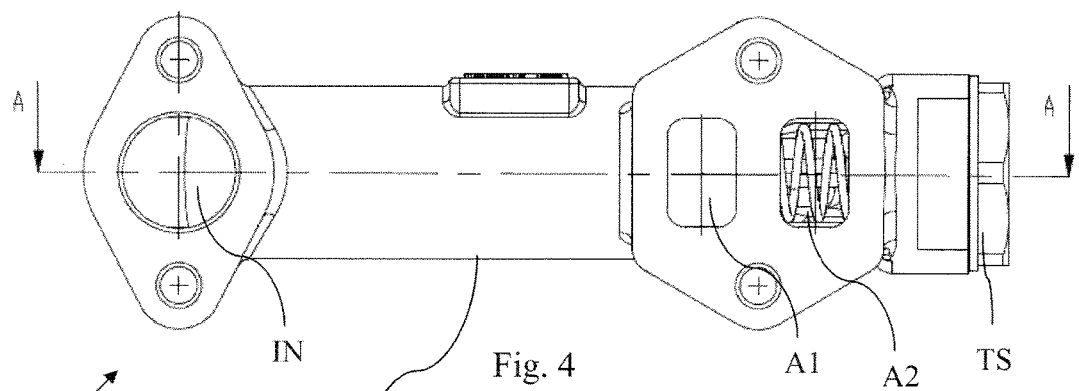
FIGS. 4 and 5 show respectively a lateral view and a relative longitudinal section of the device subject of the present invention.
Figure 5:
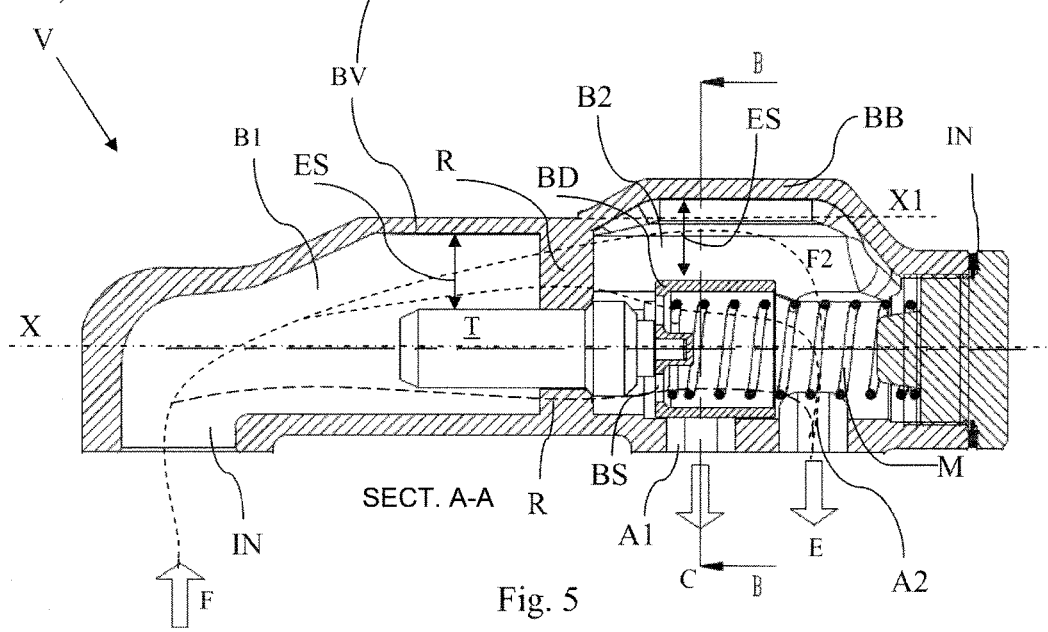

FIGS. 4-6 which represent a preferred embodiment of the invention subject of the present invention are described below.

Figure 1:
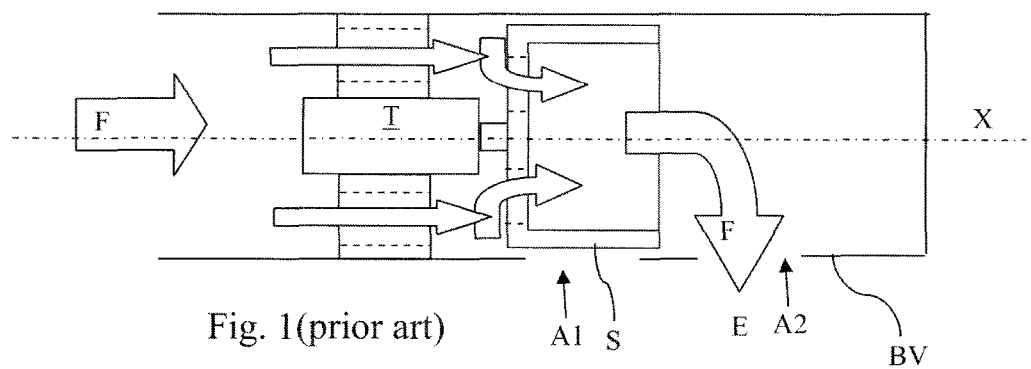
FIGS. 1-2 show two longitudinal views of slide valves according to the known art in two distinct operating conditions.
Figure 2:
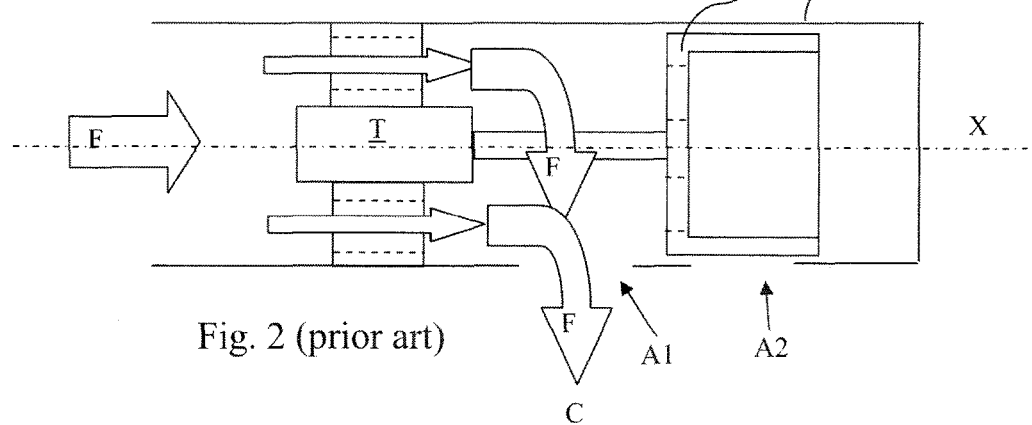
Figure 3:
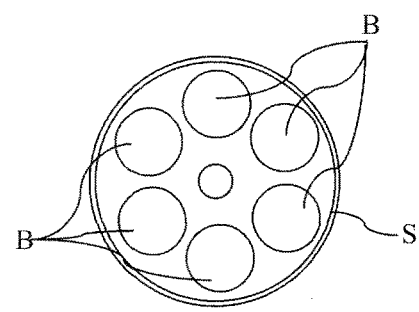
FIG. 3 shows a detail according to an axial view of the device shown in FIGS. 1 and 2.

The reference signs used here correspond to those used to describe the valves of the known art according to FIGS. 1-3 but below, each reference identifies the respective component of the above-mentioned preferred variation according to FIGS. 4-6.

In FIGS. 4-6 the valve V of the present invention comprises a tubular body BV having an inlet opening IN for a fluid and two outlet openings A1 e A2: A1 is intended to be connected to an exchanger C (not shown) and A2 is intended to be connected directly to the members of an internal combustion engine E to be lubricated.

The openings A1 and A2 have a development perpendicular to the development axis X of the tubular body BV.

A mobile shutter S is associated with the tubular body, being able to slide within it, axially according to the development axis X.

For sliding of the shutter and arrangement of the openings A1 and A2, the valve V of the present invention is a slide valve.

A sensor T filled with expansion wax activates said sliding of the shutter S.

The sensor T is associated internally with the tubular body by means of radial support elements R which keep the sensor T in a fixed position, upstream of the shutter S, according to a circulation direction of a fluid F which crosses the valve from the inlet opening IN to one of the outlet openings A1, A2.

Until the fluid reaches a predefined temperature threshold, the sensor maintains the shutter S in a retracted position, blocking the first opening A1.

Subsequently, the sensor is activated, pushing the shutter which frees the first outlet opening A1 and blocks the second outlet opening A2.

The valve V comprises a bypass duct BB, at least partially external to the body of the valve, having development X1 parallel to the development axis X of the valve body BV and partially penetrating in the body BV of the valve V.

The valve body can be seen, if the bypass duct BB is ignored, as a tubular body with axial symmetry with respect to the axis X.

Said axial symmetry is partially lost due to the penetration of the bypass duct BB in the tubular body BV.

With reference to FIG. 6, the internal cavity of the valve body BV has two opposite hemispheric profiles PE which define, in a complementary manner, the sliding seat of the shutter S.

Said sliding seat is made so that no bending stress caused by actions perpendicular to the axis X is discharged onto the sensor T.

Said bypass duct BB is made at the sliding seat of the shutter S, and is therefore parallel to the tubular envelope defined by the axial movement of the shutter, which has a preferably cylindrical shape.

In other words, the bypass duct bypasses the shutter S, at least when the latter is in a retracted position, i.e. while it blocks the first outlet opening A1, establishing communication between the part of the valve body upstream of the radial support elements R and the second outlet opening A2.

Advantageously, the fluid that crosses the valve divides into a first portion that crosses the shutter S and a second portion F2 which is directed to the second opening A2 without crossing the shutter S.

Since said operating condition of the valve, namely as a bypassed exchanger, persists for a considerable period of time, the above-mentioned advantage becomes more significant.

The tubular body BV preferably has an end, on the right in FIGS. 4 and 5, with cylindrical section to which a threaded cap TS is associated.

The cap TS defines a supporting seat for a helical spring M, which opposes extension of the shutter S, so as to re-set it to the retracted position when the temperature of the fluid drops below the above-mentioned predefined threshold.

In order to minimise the pressure losses from the valve V subject of the present invention, also the portion of the body BV, upstream of the radial support elements R, preferably has an enlargement B1 with longitudinal development, also parallel to the development X of the valve body BV. It can be considered similar to a tubular duct which penetrates with the valve body BV in the same angular penetration position of the bypass duct BB.

It can be seen from FIG. 5 that the upper half-section ES of the internal cavity of the valve body, i.e. the section relative to the above-mentioned angular portion of the enlargement B1 and the enlargement B2 generated by the bypass duct BB, is substantially constant at the sensor T and at the shutter S, so as to minimise the pressure losses.

With reference to FIG. 6, which shows a cross section B-B of the view of FIG. 5, internally the shutter S and a portion of the spring M, and the through openings BR of the shutter S can be seen.

Said openings, similarly to what is known per se, are preferably uniformly distributed angularly in the body of the shutter and have development parallel to the axis X. Embodiment variations of the non-limiting example described are possible, without departing from the protective scope of the present invention, comprising all the equivalent embodiments for a person skilled in the art.

From the above description a person skilled in the art is able to produce the subject of the invention without introducing further construction details. The elements and the characteristics illustrated in the different preferred embodiments can be combined with one another without departing from the protective scope of the present application. The content of the description of the state of the art, unless specifically excluded in the disclosure, must be considered in combination with the characteristics of the present invention, forming an integral part thereof.

The invention claimed is:

1. Bypass valve for a lubricating circuit of an internal combustion engine equipped with a cooler of a respective lubricating fluid, the valve comprising
   a tubular body (BV) defining a development axis (X) and having a first outlet opening (A1) and a second outlet opening (A2) each having a development perpendicular to said development axis (X) and having an inlet opening (IN) arranged axially with the tubular body of the valve upstream of the first outlet opening (A1) and the second outlet opening (A2), the tubular body defining a sliding seat for
   a mobile shutter (S) slidingly associated to the tubular body (BV) so that it can slide within it, according to said development axis (X), a sensor (T) filled with thermal material, adapted to operate said mobile shutter (S) between a retracted condition, blocking said first outlet opening (A1) only and an expanded condition, blocking said second outlet opening (A2) only, the sensor (T) arranged upstream of the first outlet opening (A1) and the second outlet opening (A2) and downstream of the inlet opening (IN) such that the sensor (T) is lapped by the lubricating fluid as the lubricating fluid crosses the valve from the inlet opening (IN) to the first outlet opening (A1) and as the lubricating fluid crosses the valve from the inlet opening (IN) to the second outlet opening (A2), the valve being characterized in that it comprises a bypass duct (BB) having a development parallel to said development axis (X) and partially penetrating in the tubular body (BV) to bypass said mobile shutter (S) when in said retracted condition.

2. Valve according to claim 1, wherein said bypass duct (BB) is made at the sliding seat of the mobile shutter (S).

3. Valve according to claim 1, wherein said bypass duct (BB) is at least partially external to the tubular body (BV).

4. Valve according to claim 1, wherein said sensor (T) is arranged upstream of said mobile shutter (S) according to a direction of circulation from said inlet opening (IN) to one of said outlet openings (A1, A2) and wherein said sensor (T) is kept in position by means of radial support elements (R).

5. Valve according to claim 4, wherein said tubular body (BV) comprises, upstream of said radial support elements (R), an enlargement (B1) having a longitudinal development in the same angular penetration position of the bypass duct (BB) with respect to said development axis (X).

6. Valve according to claim 5, wherein a half-section (ES) relating to said angular position of the internal cavity of the tubular body (BV) remains always substantially constant at the sensor (T) and at the mobile shutter (S).

7. Valve, according to claim 1, wherein said shutter (S) comprises one or more through openings (BS) having a development parallel to said development axis (X).

8. Internal combustion engine having a lubricating circuit equipped with a cooler of a respective lubricating liquid and with a bypass valve to exclude/include said cooler from/in the lubricating circuit in relation to an operating condition of the lubricating circuit, wherein said bypass valve is in accordance with claim 1.

9. Terrestrial vehicle comprising an internal combustion engine according to claim 8.

* * * * *